Patented Feb. 13, 1951

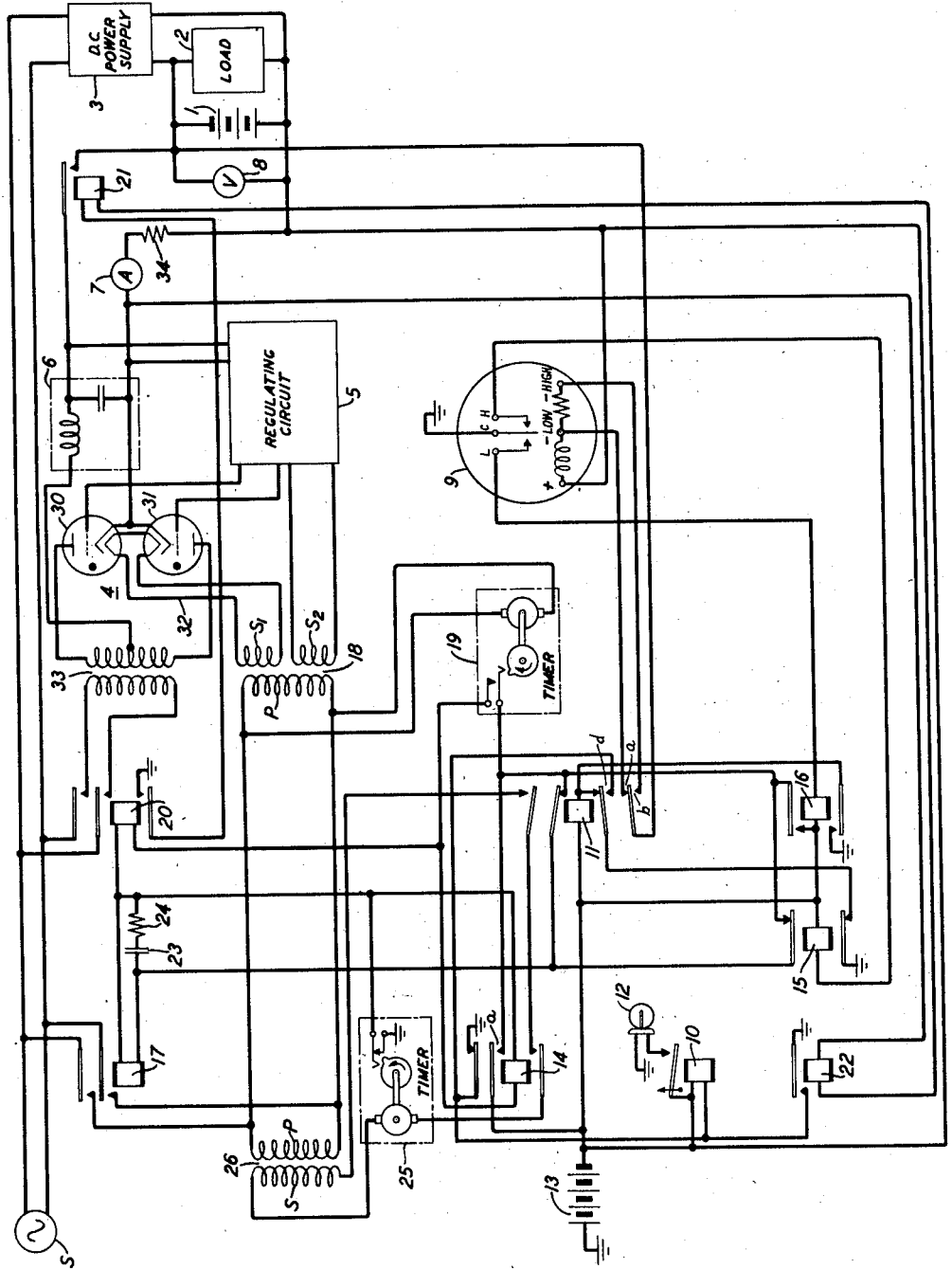

2,541,935

UNITED STATES PATENT OFFICE 2,541,935

BATTERY CHARGING APPARATUS

James A. Potter, Rutherford, N. J., assignor to Bell Telephone Laboratories, Incorporated, New York, N. Y., a corporation of New York Application August 28, 1948, Serial No. 46,595

5 Claims. (Cl. 320—11)

This invention relates to voltage regulation and more particularly to electrical control circuits for governing the charging of a battery.

It is an object of this invention to associate with a battery a normally idle charging unit and to automatically energize said unit during certain periods of low battery voltage of predetermined character so as to supply charging current to the battery.

It is also an object of this invention to automatically govern the charging cycle of a battery.

Another object of this invention is to automatically govern the starting and stopping of the charging cycle.

A further object is to automatically govern the length and the nature of the charging period.

According to a specific embodiment of the invention disclosed herein for the purpose of illustration, a charging unit normally idle is associated with a battery which is connected to a load circuit. A voltage relay is provided to continually monitor the terminal voltage of the battery. If the monitored voltage should fall below a certain value the charging cycle is initiated by first preparing the charging unit to receive energy from a power source. When this energy is available, an automatic preset timer permits the thermionic discharge elements of the charging unit to reach operating temperature. Power is then supplied to the charging unit so that it supplies charging current to the battery. Another timer controls the length of the charging period, commencing its timing when the battery has reached a certain charge. It completes the charging cycle by deenergizing the charging unit at the end of the predetermined time period. The charging unit will also be disabled at any time during the charging cycle by an overvoltage at the battery.

The charging unit may employ any well-known rectifier or, if desired, a regulated rectifier comprising gas-filled triodes with pulsing and regulating circuits as disclosed in William H. Bixby application Serial No. 35,948, filed June 29, 1948. The two-phase rectifier of the specific embodiment described herein is merely illustrative and is not to be construed as limiting as to the type of charging unit to which this invention may be applied.

The single figure of the drawing is a schematic view of a battery charging apparatus embodying the invention.

Referring to the drawing, a battery 1 is connected to a load circuit 2. This battery may be the sole power source for load circuit 2 or if desired, there may be provided an additional direct current power supply 3 of any of the types well known in the art which normally supplies current to the load circuit 2 and maintains the terminal voltage of battery 1 at a correct value. Associated with battery 1 is a charging unit comprising full-wave rectifier 4 with regulating circuit 5 and smoothing filter 6, all as disclosed in the aforementioned Bixby application. This charging unit may be the sole power supply for battery 1 or it may be auxiliary to charging unit 3. The rectifier 4 comprises two gas-filled triodes 30 and 31 having a filamentary heater 32 for heating their cathodes. A measure of the charging current is obtained by ammeter 7 and of the battery terminal voltage by voltmeter 8.

Connected across the battery is a voltage relay 9. Relay 9 is equipped with two scales, a low scale ranging from 139 to 146 volts and a high scale ranging from 145 to 152.2 volts, the voltage values being merely illustrative. Under normal conditions as shown in the drawing, the low range terminals of voltage relay 9 are connected to the terminals, respectively, of battery 1 by way of contact $a$ of a relay 11, and armature C of relay 9 registers midscale, midway between low contact L and high contact H. Under this condition all relays shown in the drawing, except relays 10 and 11, are released and the charging unit is completely deenergized and disconnected from the battery.

Relay 10 is an alarm transmitting relay and together with relay 11 has one side of its winding permanently connected to holding battery 13. If released, relay 10 would permit the lamp 12 to be energized. Relay 11 is primarily a scale changing relay and, as shown, connects the low scale terminal of relay 9 to battery 1 through contact $a$ of relay 11. The relay 11, when released, connects the high scale terminal of relay 9 to the battery 1 through contact $b$ of relay 11. Ground connection for the winding of relay 10 is obtained through the uppermost contact of a relay 14 and for the winding of relay 11 through the lower contact of relay 15.

For purposes of illustration, the normal voltage of battery 1 will be taken as 142 volts. In the event of a failure of power supply 3, for example, the voltage across battery 1 would soon decrease to a value less than 142 volts and, if the power failure is of sufficient duration, to a value less than 139 volts. Voltage relay 9 is so constructed that at 139 volts or less, armature C will complete a circuit through its low contact L. This operation of relay 9 connects ground to relay 16 causing it to operate, followed by relay 17 which is energized through the top contacts of relays 16 and 15. These relays, as are all to be described in this embodiment, are also energized by holding battery 13. The operation of relay 17 connects the primary P of transformer 18 across the alternating current power supply S.

If the decrease in voltage across battery 1 was due to a failure of the alternating current supply S, these operated relays will remain operated until power is available. If power from source S is available when the operation of relay 17 occurs, power will be immediately supplied to the secondaries $s_1$ and $s_2$ of transformer 18. These secondaries supply current to the filaments of tubes 30 and 31 and of thermionic tubes (not shown) associated with regulating circuit 5. Coincident with the energizing of the filament transformers is the energizing of the motor of motor-driven timer 19 through relay 17. Timers 19 and 25 are of the type disclosed in United States Patent 2,377,370 to J. A. Potter et al. dated June 5, 1945. This timer has been adjusted to allow the aforementioned filaments sufficient time to be heated to operating temperature before power is supplied to the plates of the tubes associated with these filaments. At the end of the timing interval the contacts of timer 19 are closed and maintained in this position, operating relays 14 and 20 by connecting battery 13 to their windings through the upper contact of relay 16. A locking circuit for relays 14 and 20 is established through contact $a$ of relay 14. The power input transformer 33 of rectifier 4 is now energized from source C through the upper contacts of relay 20 and the rectifier 4, now fully energized, is connected to the negative terminal of battery 1 through relay 21 which is operated through the lower contact of relay 20, and to the positive terminal through the ammeter 7 and the resistor 34. The output current as measured by ammeter 7 should now rise to normal value of 90 amperes and be held there by regulating circuit 5.

It has already been shown that alarm relay 10 is held operated when the system is idle, thus preventing lamp 12 from being energized. Now that the system is in operation relay 10 is held operated through relay 22 which shunts a small portion of the output current of rectifier 4 and is so adjusted as to remain operated when the output current exceeds 65 amperes.

Charging continues with no change in the relays until the battery 1 voltage increases beyond 139 volts at which time the low contact L of voltage relay 9 no longer makes contact with the armature C, thus releasing relay 16. No further changes occur until the battery voltage attains 146 volts so as to cause the completion of a circuit through armature C and contact H for connecting ground to the winding of relay 15, causing it to operate. The operation of relay 15 releases relay 11 by removing the lock-up path through its bottom contact, the alternate lock-up path of relay 11 having been opened by the release of relay 16.

The release of relay 11 immediately switches the connection of battery 1 to voltage relay 9 from the low scale to the high scale by opening the circuit through contact $a$ and closing a circuit through contact $b$. The armature of voltage relay 9 will assume a midscale position very quickly since its high range is between 145 and 152.2 volts and the battery voltage will not have changed appreciably during the fraction of a second required for relay 15 to operate and for relay 11 to subsequently release.

The return to midscale of the armature of voltage relay 9 releases relay 15. During the short time between the release of relay 11 and the subsequent release of relay 15, the battery connection is removed from relay 17. Relay 17 does not, however, release even momentarily during this short time by having the voltage on its winding sustained by the charge on the 1,500-microfarad capacitor 23 which is connected across the winding of relay 17 in series with the 10-ohm resistor 24.

A further function of the releasing of relay 11 is to start timer 25. Its motor is energized over the circuit through the lower contact of relay 14 and the uppermost contact of relay 11 from alternating current power available at the primary P of transformer 26 due to the operation of relay 17. Initiation of this timing interval marks the beginning of the timed overcharge period which proceeds independently of overcharge voltage limitations to be described hereinafter.

Note now that alarm relay 10 is operated by ground connection through contact $d$ of relay 11 and the lower contact of relay 15 which circuit path is possible only when the battery voltage is over 146 volts, putting voltage relay 9 on the high scale and releasing relay 11. This completes the three possibilities for maintaining relay 10 operated:

1. When the system is idle.
2. When the output current is over 65 amperes.
3. When the battery voltage is over 146 volts.

A warning of any failure of the output current of rectifier 4 is thus obtained by the lighting of lamp 12 which is energized only when relay 10 is released.

If for any reason control is lost by regulating circuit 5 so that the battery voltage exceeds 152.2 volts, armature C of relay 9 will make its high contact H operating relay 15. This will allow relay 17 to open since the 1,500-microfarad capacitor 23 will hold relay 17 operated only a fraction of a second as previously explained. Release of relay 17 deenergizes the motor of timer 19 to open its contact, causing relays 14 and 20 to release, thereby completely deenergizing the charging system. The load is disconnected by the release of relay 21 due to its loss of ground through relay 20.

However, if charging proceeds normally, i. e., with no overcharge greater than 152.2 volts, relay 15 will remain released and overcharging will continue for a length of time determined by the adjustment of timer 25. At the end of this time the contacts of timer 25 will open, removing ground from relays 14, 17, 20 and 21, and thus deenergizing the system.

All relays except relay 10 will remain released until armature C of relay 9 makes its low contact. Since relay 9 is now on its high scale, it will make its low contact when battery 1 voltage has decreased to 145 volts or less. This operation of relays 9 and 16 is only momentary since as soon as it occurs relay 16 operates so as to operate and lock up relay 11. This immediately changes relay 9 back to its low scale, putting its armature C at midscale again, and releases relay 16.

During the momentary operation of relay 16 a by-product effect is produced, namely, the brief energizing of relay 17. This condition starts motor timer 19 and briefly energizes transformers 18 and 26 but does not adversely affect the operation of the unit. This reoperation of relay 11 marks the point at which the start-and-stop relay system is restored to its initial and normally idle condition.

While the control circuit has been described as operating in a specific manner and for specific operating values, it is to be understood that this was merely to facilitate description and should in no way be construed as limiting.

A feature of this control circuit is that it does not energize the charging unit as a result of brief fluctuations of the battery terminal voltage below normal. The charging unit is not energized until timer 19 has completed its preadjusted time interval and locks up its contacts. Any return to normal voltage or any voltage above 139 volts during this timing interval will release relays 16 and 17 due to the armature C of voltage relay 9 returning to midscale. This returns the charging unit and its associated control circuit to their normal stand-by condition. Thus any decrease in voltage below 139 volts for a length of time less than the time delay interval of timer 19 will not cause the charging unit to supply charging current to the battery. It is also apparent that any return to normal voltage before timer 19 has completed its timing interval will prevent the energizing of the charging unit in case there is a time interval between the decrease in battery 1 voltage and the starting of timer 19.

Both timer 17 and timer 25 are equipped with spring unwinding devices so that they will always unlock their contacts and return to a condition of zero time interval should they be deenergized at any time.

Timer 19 has been specifically described as being preset so as to allow time for the tube filaments to heat sufficiently. In another embodiment it may be more important to set the time according to the minimum duration of below-normal battery voltage to which the system is to be sensitive, filament heat time being of secondary or of no importance. There are also many variations possible in the arrangement and specific operation of the many relays without deviating from the spirit of the invention.

What is claimed is:

1. In combination with a battery for supplying current to a load and charging means for normally maintaining the voltage of said battery within a normal operating range, an auxiliary normally idle charging means, means responsive to a decrease in the voltage of said battery below a normal value for conditioning said auxiliary charging means for operation, means for supplying energy to said auxiliary charging means for causing said auxiliary means to supply current to said battery for charging it, means for causing said charging to continue for a predetermined period of sufficient duration to cause said battery to be charged to a voltage above said normal operating range, said predetermined period commencing at a time when the battery voltage has increased to a certain normal operating value, and means for deenergizing said auxiliary charging means at the end of said predetermined time and causing it to be restored to its normally idle condition.

2. A power supply for charging a battery comprising means responsive to a decrease in the voltage of said battery below a normal operating value for energizing said power supply to cause it to supply charging current to said battery, means for causing said charging to continue for a predetermined time of sufficient duration to cause said battery to be charged to a voltage above the normal operating range, said time commencing when the voltage of said battery has been increased beyond a certain predetermined value, and means for deenergizing said power supply at the end of said predetermined time.

3. A combination in accordance with claim 2 in which said last-mentioned means is operable in response to a certain voltage of said battery larger than the normal battery voltage as well as to the end of said predetermined time.

4. In combination with a battery and a source of electrical power, normally idle means for charging said battery from said source comprising a space discharge device having a cathode and a space current path, means responsive to a decrease in the voltage of said battery below a normal operating value for conditioning said charging means for operation, said means comprising means for heating said cathode to operating temperature and means for subsequently supplying space current to said device, means responsive to an increase in voltage above a normal operating value for causing charging to continue for a predetermined time of sufficient duration to cause said battery to be overcharged to a voltage above the normal operating range, and means responsive to an excessive overcharge to deenergize said charging means and to restore said charging unit to its normally idle condition.

5. The combination with a battery for supplying current to a load and charging means for normally maintaining said battery charged to a voltage within a normal operating range of an auxiliary charging means, means responsive to a decrease in battery voltage to a value below the normal voltage range due to a power supply failure for conditioning said auxiliary charging means for supplying charging current to said battery when the power is restored, means energized in response to restoration of the power supply for causing said auxiliary charging means to supply charging current to said battery for a predetermined period of sufficient duration to cause the battery to be overcharged to a voltage above the normal operating voltage range, said predetermined period starting at a time when the battery voltage has been increased to a certain voltage, and means responsive to the deenergization of said preceding means at the end of said predetermined period for restoring said auxiliary charging means to its original condition which preceded said power failure.

JAMES A. POTTER.

REFERENCES CITED

The following references are of record in the file of this patent:

UNITED STATES PATENTS

| Number | Name | Date |
|---|---|---|
| 281,176 | Brush | July 10, 1883 |
| 290,873 | Farmer | Dec. 25, 1883 |
| 1,208,044 | Suren | Dec. 12, 1916 |
| 1,222,257 | Auth | Apr. 10, 1917 |
| 1,393,503 | Clausen | Oct. 11, 1921 |
| 1,659,045 | Nelson | Feb. 14, 1928 |
| 1,893,223 | Burkle | Jan. 3, 1933 |
| 1,928,812 | Dawson | Oct. 3, 1933 |
| 1,961,024 | Whitney | May 29, 1934 |
| 2,248,821 | Haselton et al. | July 8, 1941 |
| 2,300,296 | Langabeer et al. | Oct. 27, 1942 |
| 2,307,576 | De Croce | Jan. 5, 1943 |
| 2,377,370 | Potter et al. | June 5, 1945 |
| 2,420,577 | Van Lew | May 13, 1947 |

FOREIGN PATENTS

| Number | Country | Date |
|---|---|---|
| 471,766 | Germany | June 27, 1928 |